(12) United States Patent
Sure et al.

(10) Patent No.: US 10,649,862 B1
(45) Date of Patent: May 12, 2020

(54) REDUCING FAILBACK PERFORMANCE DURATION IN DATA REPLICATION SYSTEMS

(71) Applicant: International Business Machines Corporation, Armonk, NY (US)

(72) Inventors: Ravindra Sure, Bangalore (IN); Sanjiv Kumar, Bettiah (IN); Shashikant Banerjee, Hazaribag District (IN); Karrthik K G, Kodaikanal (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/224,655

(22) Filed: Dec. 18, 2018

(51) Int. Cl.
*G06F 12/00* (2006.01)
*G06F 11/14* (2006.01)
*G06F 3/06* (2006.01)

(52) U.S. Cl.
CPC .......... *G06F 11/1469* (2013.01); *G06F 3/065* (2013.01); *G06F 3/0619* (2013.01); *G06F 3/0683* (2013.01); *G06F 2201/84* (2013.01)

(58) Field of Classification Search
CPC .... G06F 11/1469; G06F 3/0619; G06F 3/065; G06F 3/0683; G06F 2201/84
See application file for complete search history.

(56) References Cited

U.S. PATENT DOCUMENTS

| 2007/0162716 | A1* | 7/2007 | Yagisawa ............ G06F 11/1435 711/162 |
| 2015/0286538 | A1 | 10/2015 | Brown et al. |
| 2016/0313935 | A1 | 10/2016 | Blea et al. |
| 2017/0060975 | A1 | 3/2017 | Akyureklier et al. |

\* cited by examiner

*Primary Examiner* — Shawn X Gu
(74) *Attorney, Agent, or Firm* — Zilka-Kotab, P.C.

(57) ABSTRACT

A computer-implemented method, according to one embodiment, includes: establishing a recovery cluster as an acting primary cluster in response to determining that a primary cluster has gone offline. In response to determining that the primary cluster is back online, the acting primary cluster is synched with the online primary cluster by: capturing a snapshot of the acting primary cluster, and pausing a normal queue of the acting primary cluster. The snapshot of the acting primary cluster is further compared with a most recent snapshot of the online primary cluster, and each difference therebetween is added to a priority queue of the acting primary cluster. Each of the differences in the priority queue are transmitted to the online primary cluster, followed by the entries in the normal queue in response to determining that each of the differences in the priority queue have been transmitted to the online primary cluster.

20 Claims, 7 Drawing Sheets

REDUCING FAILBACK PERFORMANCE DURATION IN DATA REPLICATION SYSTEMS

BACKGROUND

The present invention relates to data storage systems, and more specifically, this invention relates to transferring operability between storage locations in data replication systems.

In current data replication systems, the application nodes at a storage location, such as a cache site or "primary cluster", modify the data and queue the data modification operations to a gateway node. The gateway node may apply optimization techniques to the operations which are received, e.g., such as coalescing small contiguous write operations into single write operation, before sending the operations asynchronously to a remote location, such as a home cluster or "recovery cluster". Accordingly, the remote location is able to maintain a redundant copy of the data at the storage location.

This redundant copy of the data at the storage location is particularly useful in situations where the storage location goes offline, as the remote location is able to assume operational responsibility relatively seamlessly in response to determining that the storage location is unable to. However, when the storage location comes back online, there is often a significant amount of data and applications which are transferred back from the remote location before the storage location can actually regain operational responsibility.

SUMMARY

A computer-implemented method, according to one embodiment, includes: establishing a recovery cluster at a second storage location as an acting primary cluster in response to determining that a primary cluster at a first storage location has gone offline. In response to determining that the primary cluster at the first storage location is back online, the acting primary cluster is synched with the online primary cluster. The acting primary cluster is synched with the online primary cluster by: capturing a snapshot of the acting primary cluster, and pausing a normal queue of the acting primary cluster. The snapshot of the acting primary cluster is further compared with a most recent snapshot of the online primary cluster. Each difference between the snapshot of the acting primary cluster and the most recent snapshot of the online primary cluster is added to a priority queue of the acting primary cluster. Each of the differences in the priority queue are also transmitted to the online primary cluster. Furthermore, entries in the normal queue are transmitted to the online primary cluster in response to determining that each of the differences in the priority queue have been transmitted to the online primary cluster.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for efficiently recovering from intentional and unintentional failure events experienced at storage locations in a distributed data replication system. For instance, application downtime and/or outage is significantly reduced during the failback of applications to a primary cluster after being brought back online, e.g., as will be described in further detail below.

In one general embodiment, a computer-implemented method includes: establishing a recovery cluster at a second storage location as an acting primary cluster in response to determining that a primary cluster at a first storage location has gone offline. In response to determining that the primary cluster at the first storage location is back online, the acting primary cluster is synched with the online primary cluster. The acting primary cluster is synched with the online primary cluster by: capturing a snapshot of the acting primary cluster, and pausing a normal queue of the acting primary cluster. The snapshot of the acting primary cluster is further compared with a most recent snapshot of the online primary cluster. Each difference between the snapshot of the acting primary cluster and the most recent snapshot of the online primary cluster is added to a priority queue of the acting primary cluster. Each of the differences in the priority queue are also transmitted to the online primary cluster. Furthermore, entries in the normal queue are transmitted to the online primary cluster in response to determining that each of the differences in the priority queue have been transmitted to the online primary cluster.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: perform the foregoing method.

Figure 1:
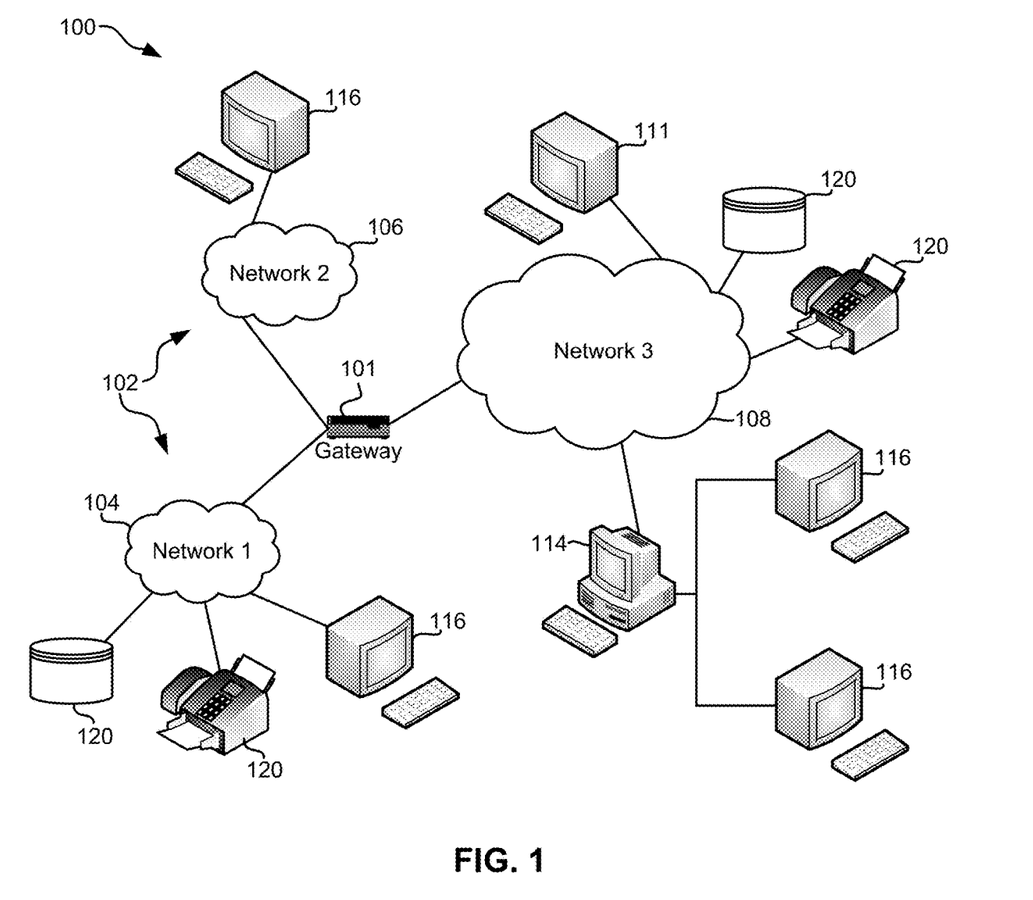
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
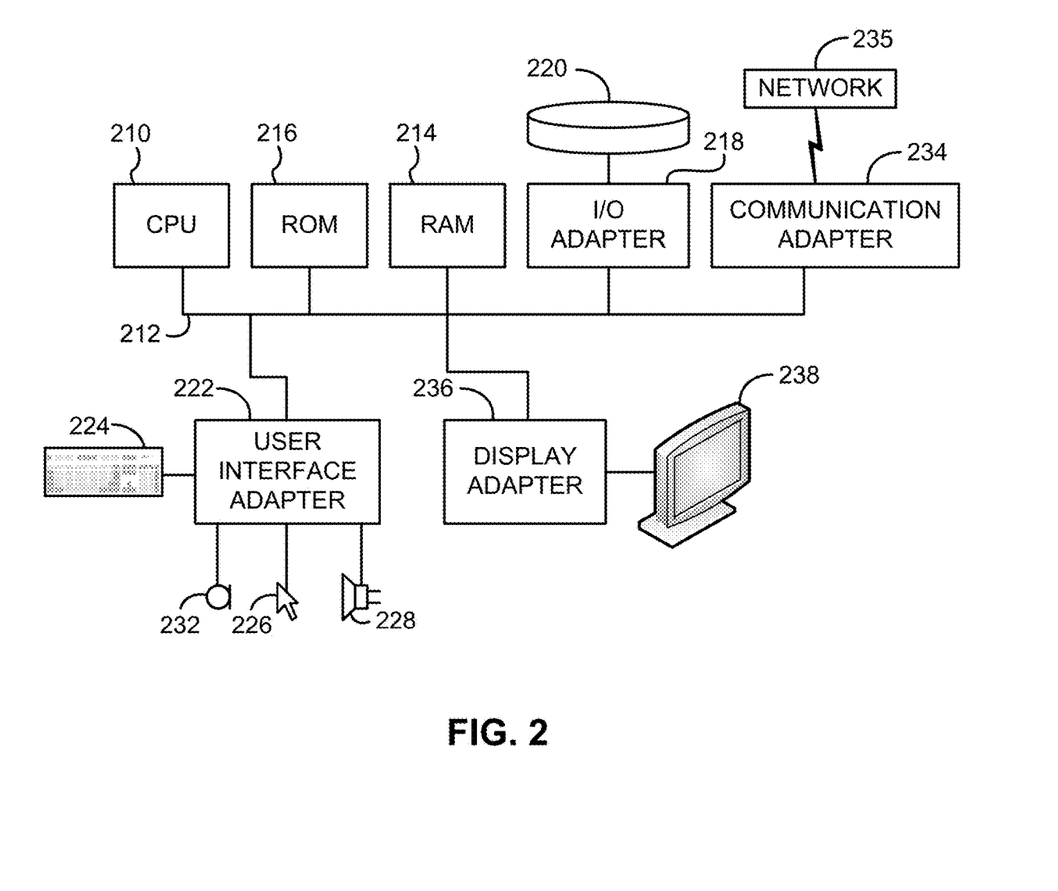
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
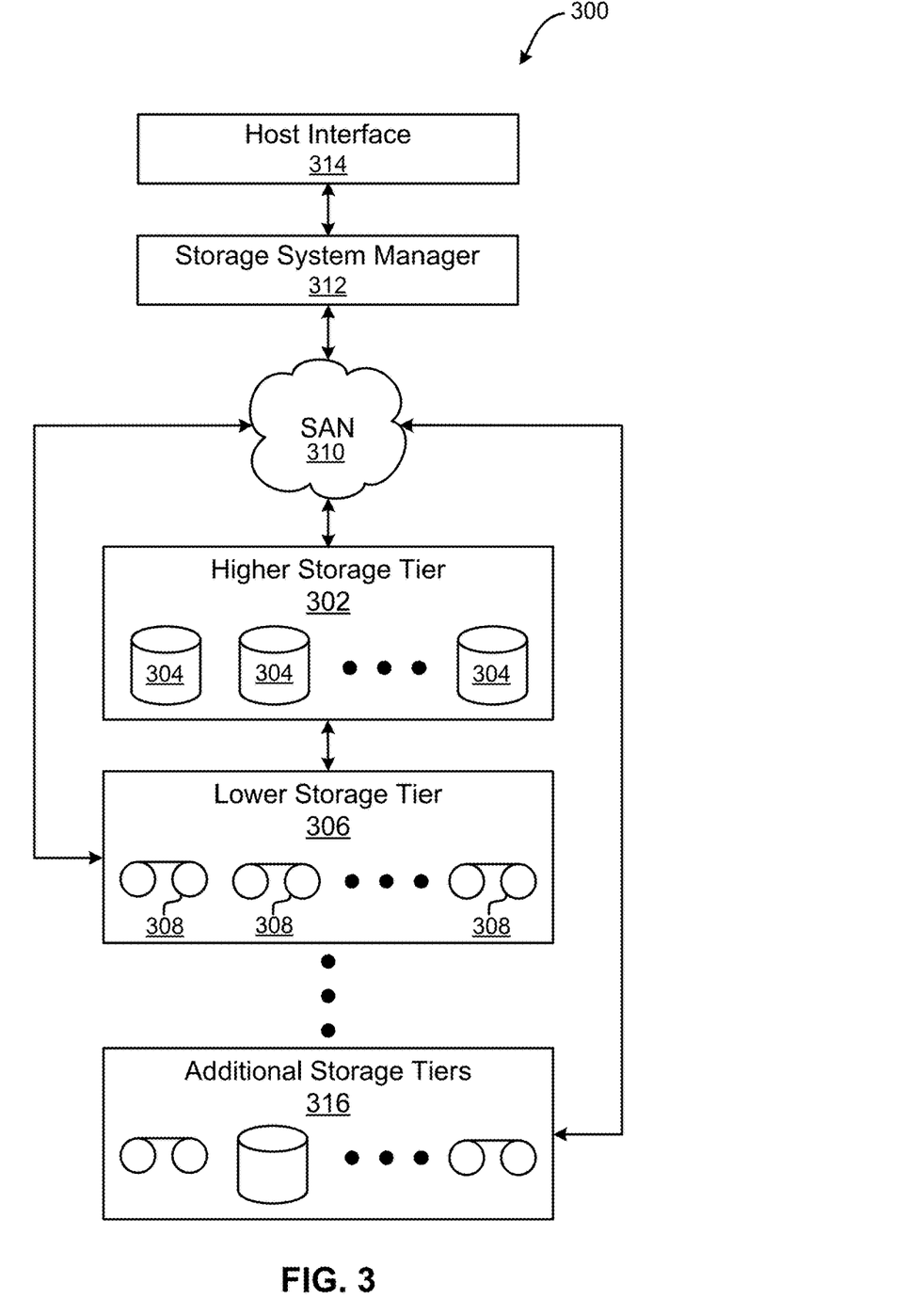
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, the application nodes at a first storage location, such as a cache site or "primary cluster", modify the data and queue the data modification operations, e.g., to a gateway node. The gateway node may apply optimization techniques to the operations which are received, e.g., such as coalescing small contiguous write operations into single write operation, before sending the operations asynchronously to a second storage location, such as a home cluster or "recovery cluster". Accordingly, the second storage location is able to maintain a redundant copy of the data at the first storage location.

This redundant copy of the data at the second storage location is particularly useful in situations where the first storage location goes offline, e.g., such as in disaster situations, as the second storage location is able to assume operational responsibility relatively seamlessly in response to determining that the first storage location is unable to maintain it. However, when the first storage location comes back online, there is often a significant amount of updated data and applications which are transferred back from the second storage location before the first storage location can actually regain operational responsibility.

Conventional procedures involve repopulating the first storage location changes made at the second storage location iteratively, while the second storage location maintains operational responsibilities. In each iteration of these conventional procedures, a new snapshot is taken and the differences between the new snapshot and the previous (base) snapshot are identified. These differences are then replicated to the first storage location. This iterative process continues multiple times and at the last iteration, operational responsibilities are transferred from the second storage location to the first storage location. However, this process involves a significant amount time during which applications running on the storage locations are inoperable, thereby resulting in undesirable processing delays.

In sharp contrast to these conventional shortcomings, various ones of the embodiments included herein are able to transfer operational responsibilities between different storage locations with little to no application downtime. As a result, processing delays resulting from an offline storage location are essentially eliminated, system throughput is increased, strain on queues throughout the system is reduced, system resources are conserved, etc., e.g., as will be described in further detail below.

Figure 4:
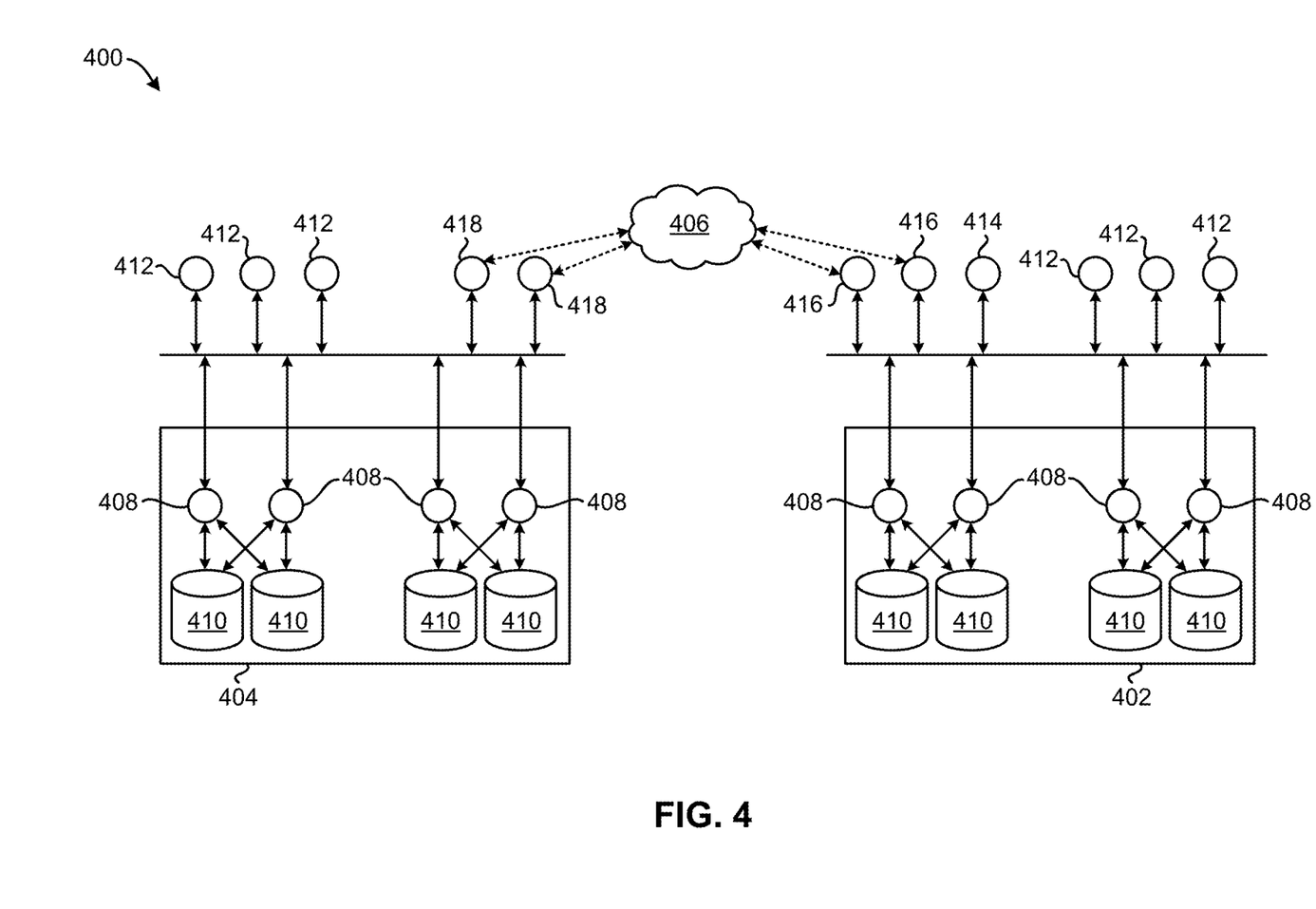
FIG. 4 is partial representational view of a distributed storage system in accordance with one embodiment.

Looking to FIG. 4, a distributed storage system 400 is illustrated in accordance with one embodiment. As an option, the present storage system 400 may be implemented in conjunction with features from any other embodiment listed herein, such as those described with reference to the other FIGS. However, such storage system 400 and others presented herein may be used in various applications and/or in permutations which may or may not be specifically described in the illustrative embodiments listed herein. Further, the storage system 400 presented herein may be used in any desired environment. Thus FIG. 4 (and the other FIGS.) may be deemed to include any possible permutation.

As shown, the distributed storage system 400 includes a primary site 402 and a secondary site 404 which are connected by a network 406. According to some approaches, the primary site 402 may be considered as being a "first storage location" or a "primary cluster", while the secondary site 404 is considered a "second storage location" or a "recovery cluster", e.g., as would be appreciated by one skilled in the art. Thus, in some approaches the primary site 402 receives and satisfies data operations received (e.g., from a user), while the secondary site 404 maintains an updated copy of the data at the primary site 402 by replicating data operations satisfied at the primary site 402.

The network 406 may be of any type, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the primary site 402 and the secondary site 404 are able to communicate with each other regardless of the amount of separation which exists therebetween, e.g., despite being positioned at different geographical locations.

Both the primary site 402 and the secondary site 404 include a number of data access nodes 408 which are coupled to various data storage devices 410. In some approaches, one or more of the data access nodes 408 serve as virtual machines which provide access to data stored in the distributed storage system 400. Thus, various ones of the data access nodes 408 may implement (e.g., run) any number of applications. According to an illustrative approach, which is in no way intended to limit the invention, one or more of the data access nodes 408 serve as a migration client which issues read operations, write operations, update operations, etc. received from a user and/or application being run thereby.

Moreover, in some approaches, each of the data storage devices 410 at each of the respective sites 402, 404 are of a same type of storage, e.g., SSD, HDD, magnetic tape, etc. According to an illustrative example, each of the data storage devices 410 at the primary site 402 include SSDs, while each of the data storage devices 410 at the secondary site 404 include HDDs. However, in other approaches the various storage devices 410 at either of the respective sites may include more than one different type of storage.

Each of the data access nodes 408 are also in communication with a several different node types. For instance, data access nodes 408 at both the primary site 402 and the secondary site 404 are coupled to a plurality of compute nodes 412. Looking specifically to the primary site 402, the compute nodes 412 may currently be running one or more applications. Each of these compute nodes at the primary site 402 are also coupled to a master gateway node 414 which in turn is coupled to more than one different worker gateway nodes 416. It follows that in some approaches the compute nodes 412 send I/O operations which are executed at the primary site 402 (e.g., by the storage nodes 408) to the master gateway node 414 using any desired remote procedure call (RPC).

Once the I/O operations are sent to the master gateway node 414, the compute nodes 412 at the primary site 402 return to performing the respective applications being performed thereon. However, the master gateway node 414 stores the asynchronous data replication operations received form the compute nodes 412 in a queue. Accordingly, although now shown in FIG. 4, the master gateway node 414 includes a queue in some approaches. The queue may manage the received operations according to any desired structure. For instance, in some approaches the queue processes the operations received in a first-in-first-out (FIFO) manner. However, in other approaches the processes the operations received in a last-in-first-out (LIFO) manner. The master gateway node 414 may apply one or more optimization techniques on the asynchronous operations in some approaches. For example, the master gateway node 414 coalesces smaller, contiguous write operations into a single, larger write operation while removing negatable operations, e.g., such as file create operations which are followed by file removal operations, e.g., as would be appreciated by one skilled in the art after reading the present description.

With continued reference to FIG. 4, each of the worker gateway nodes 416 at the primary site 402 are paired (e.g., matched) with a corresponding I/O node 418 at the secondary site 404. Accordingly, asynchronous data replication operations which are queued at the master gateway node 414 can be distributed across the multiple worker gateway nodes 416, and then sent to the corresponding I/O nodes 418. Thus, the data replication operations are transferred from the primary site 402 to the secondary site 404 in an efficient manner which also actively avoids system crashes by distributing the processing load. The achievable throughput of the system is also increased as a result of implementing multiple worker gateway and I/O node pairs 416, 418 which are capable of sending data replication operations simultaneously and in parallel. It should also be noted that various ones of the nodes included at each of the respective sites 402, 404 may include a "normal queue" and/or a "primary queue" (not shown) for accumulating data operations. In preferred approaches, the data operations which have been accumulated in the primary queue have a higher priority than those data operations which have been accumulated in the "normal queue". In other words, data operations in the primary queue are implemented (e.g., transmitted) before data operations which are in the normal queue, e.g., as will be described in further detail below.

Upon receiving data replication operations, the I/O nodes 418 at the secondary site communicate with the data access nodes 408 such that data stored in the various storage devices 410 is updated accordingly. As a result, the secondary site 404 serves as a backup for the data stored at the primary site 402, e.g., for data retention purposes. Thus, any updates, deletes, overwrites, new writes, etc. performed at the primary site 402 and/or elsewhere in the distributed storage system 400 are reflected at the secondary site 404.

It should be noted that the embodiment illustrated in FIG. 4 may include more or fewer components depending on the desired approach. For instance, the system 400 includes one or more servers at each of the primary and secondary sites 402, 404 in some approaches. In some approaches, the data access nodes 408 may be coupled to a server using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Moreover, the process of forming a communication link between any one or more of the data access nodes 408, a server (not shown), the compute nodes 412, the master gateway node 414, the worker gateway nodes 416, the I/O nodes 418, etc., may implement any protocols and/or processes which would be apparent to one skilled in the art after reading the present description.

According to some embodiments, an active file management (AFM) caching scheme is used in conducting the transfer of data between two storage locations such that data at each of the storage locations remains synced. As mentioned above, this is achieved in some approaches by implementing asynchronous continuous replication of the primary cluster at a first storage location to the recovery cluster at a second storage location. In such approaches, the asynchronous replication operations allow for network outage to not have an effect on the applications operating on the primary cluster. Thus, when remote connectivity is established to the recovery cluster at the second storage location, each of the changes made to data in the primary cluster are replicated to the recovery cluster asynchronously. An AFM caching scheme may also be enhanced in some approaches to establish a disaster recovery (DR) relationship between the first and second storage locations, e.g., by adding support for synchronized peer snapshots to continually create periodic consistent peer snapshots of the primary cluster and/or secondary cluster. These snapshots are also captured asynchronously and in-line in some approaches such that DR procedures are able to use a most recent peer snapshot to perform recovery processes.

As mentioned above, maintaining one or more in-memory queues (e.g., at one or more gateway nodes) of pending data operations allows transient network outages between the data storage locations to be masked from application requests. More than one queue may even be implemented at a given storage location. For example, both a priority queue and a normal queue are implemented at given clusters in some approaches, and may be used to ensure that file system operations are performed at the clusters in an intended order. The file system operations can thereby be replicated in the same order which they were originally performed, thereby ensuring data conformity between two or more different locations. This data conformity is particularly desirable in situations where the cluster at a given storage location goes offline. For instance, a cluster may go offline unexpectedly (or at least unintentionally) as a result of a disaster event in some situations, while in others a cluster may be taken offline as part of a planned outage situation.

An unexpected failure of a primary cluster is remedied in some approaches by performing a failover procedure from the failed primary cluster to a recovery cluster. The redundant copy of data stored at the recovery cluster may thereby be used to maintain system operation while the primary cluster remains offline. However, because data is replicated to the recovery cluster asynchronously from the primary cluster which may experience a disaster situation at any arbitrary time, the data at recovery cluster may not be fully consistent with that at the primary cluster. This may result in inconsistencies and could even result in applications accessing data which has actually been invalidated at the primary cluster prior to going offline. Accordingly, a most recent peer snapshot (e.g., failover snapshot) taken of the primary cluster is used in some approaches to ensure that the data at the recovery cluster is updated. In response to restoring the recovery cluster to a consistent point, applications can be initiated and allowed to access the restored data there. However, there may still be some data lost due to restoration of the recovery cluster using the most recent peer snapshot, e.g., as would be appreciated by one skilled in the art after reading the description. The amount of data lost would depend on the RPO interval defined for the system and the time that the primary cluster experienced the disaster event with respect to the RPO interval.

However, sometimes maintenance performed at a primary cluster involves performing a failover of applications to a recovery cluster during the maintenance window. Again, in some approaches data is replicated from the primary cluster to the recovery cluster asynchronously. Therefore, all pending data is preferably flushed to recovery cluster before actually performing the failover procedure. It is also preferred that an RPO peer snapshot is captured after the pending data has been flushed to the recovery cluster, but before the failover procedure is initiated. This peer snapshot may be referred to herein as a "failover snapshot". Moreover, because this type of failover procedure is planned and no data is lost in the process, no data updates are performed at the recovery cluster following the primary cluster going offline. Accordingly, applications experience virtually no downtime. The differences between performing a planned outage and reacting to a disaster situation are illustrated at a high level in the flowchart of FIG. 5B below in accordance with one embodiment.

Once the primary cluster comes back online, operational control is preferably transferred back thereto. A failback procedure is implemented in some approaches to move applications back to the primary cluster. During the time which the recovery cluster is offline, at least some data updates are performed at the recovery cluster. Thus, before the failback procedure is performed, it is desirable that the data at the primary cluster is synced with the data at the recovery cluster.

Figure 5A:
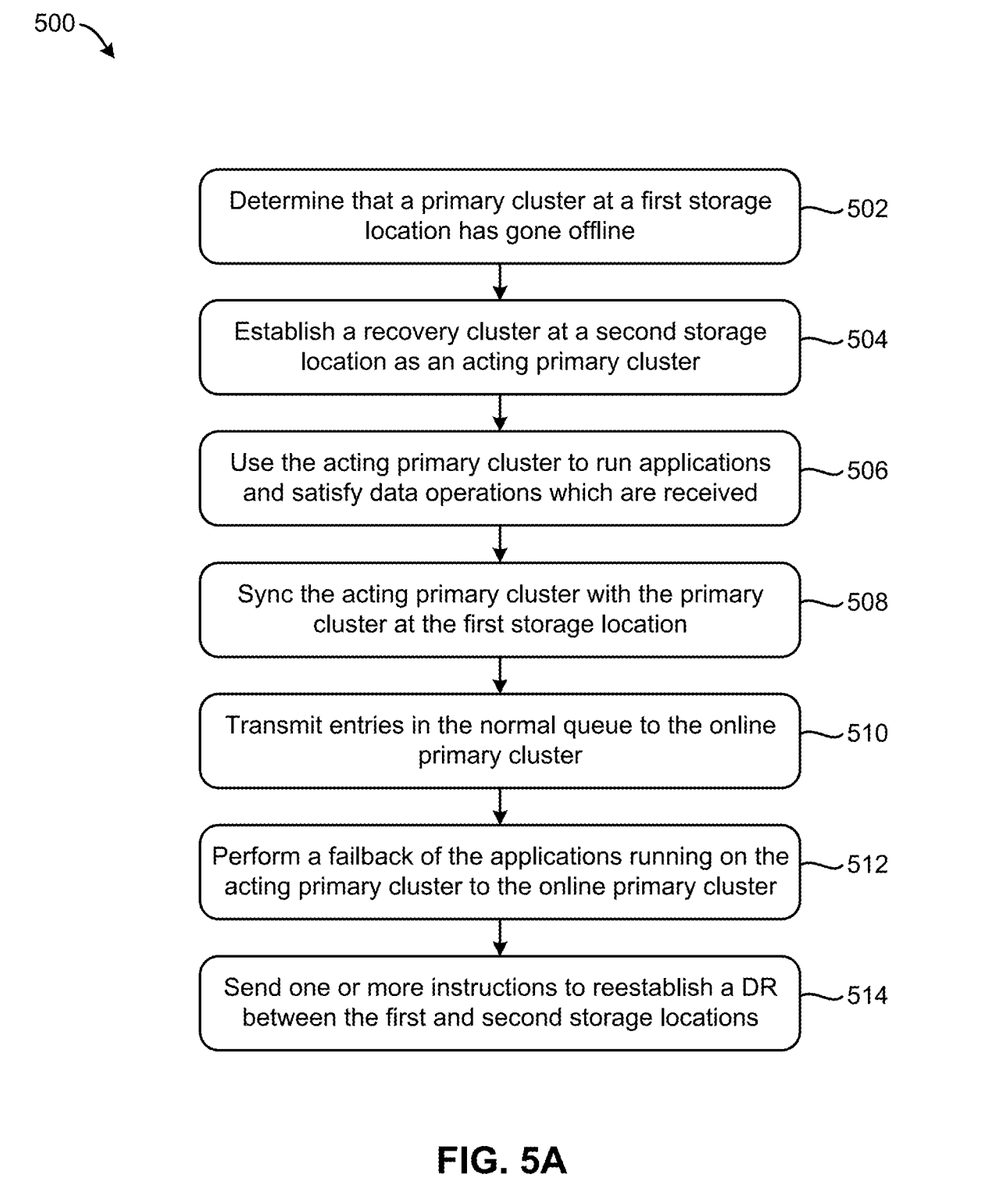
FIG. 5A is a flowchart of a method in accordance with one embodiment.

Again, various ones of the embodiments included herein are able to transfer operational responsibilities between different storage locations with little to no application downtime. As a result, processing delays resulting from an offline storage location are essentially eliminated, system throughput is increased, strain on queues throughout the system is reduced, system resources are conserved. For instance, the flowchart of FIG. 5A illustrates a method 500 of performing failover and/or failback procedures between storage locations of a distributed data replication system in accordance with one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, one or more of the processes included in method 500 are performed by a node of a recovery cluster at a second storage site (e.g., see 404 of FIG. 4 above). However, in various other embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 502 includes determining that a primary cluster at a first storage location has gone offline. Depending on the approach, a determination that the primary cluster has gone offline may be made in response to receiving a warning message, not receiving a reply to a request sent to the primary cluster, evaluating a maintenance schedule of the primary cluster, etc. Accordingly, in some approaches the primary cluster may have gone offline intentionally, while in other approaches the primary cluster may have gone offline in response to an unpredicted disaster event. It follows that the primary storage cluster at the first storage location is referred to herein as the "offline primary cluster" while offline.

Operation 504 further includes establishing a recovery cluster at a second storage location as an acting primary cluster. In other words, the recovery cluster at the second storage location at least temporarily acts as the primary cluster while the initial primary cluster remains offline. Accordingly, the recovery cluster at a second storage location is referred to herein as the "acting primary cluster" when acting as such.

Figure 5B:
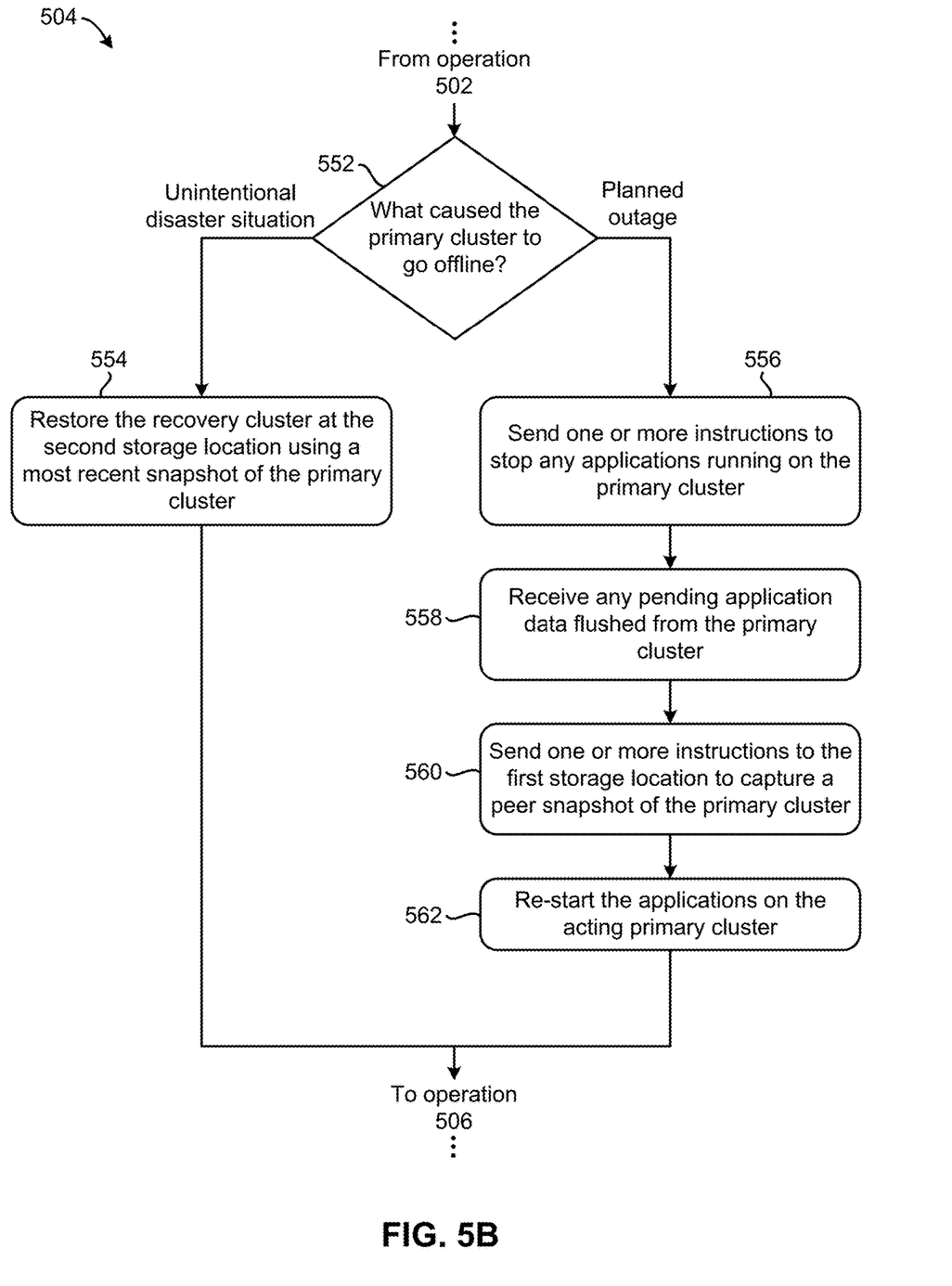
FIG. 5B is a flowchart of sub-processes for one of the operations in the method of FIG. 5A, in accordance with one embodiment.

As noted above, manner in which the primary cluster actually goes offline differs depending on the approach. For instance, in some approaches the primary cluster goes offline in response to experiencing a disaster event at the first storage location, while in other approaches the primary cluster goes offline in accordance with a planned procedure. Moreover, these differences have an effect on how the recovery cluster is established at the second storage location as the acting primary cluster. For instance, referring momentarily to FIG. 5B, sub-processes for establishing the second storage location as the acting primary cluster based on how the primary cluster went offline are illustrated at a high level in accordance with one embodiment. Accordingly, one or more of the sub-processes included in FIG. 5B may be used to perform operation 504 of FIG. 5A. However, it should be noted that the sub-processes of FIG. 5B are illustrated in accordance with one embodiment which is in no way intended to limit the invention.

As shown at decision 552, a determination is made as to what caused the primary cluster to go offline. From decision 552, the flowchart advances differently depending on the context in which the primary cluster at a first storage location went offline. For instance, the flowchart proceeds to sub-operation 554 in response to determining that the primary cluster went offline as a result of experiencing an unintentional disaster situation, yet proceeds to sub-operation 556 in response to determining that the primary cluster reached a planned (e.g., intended) outage.

Looking specifically to sub-operation 554, the recovery cluster at the second storage location is restored using a most recent snapshot (e.g., failover snapshot) of the primary cluster. According to an illustrative approach, sub-operation 554 includes using the most recent recovery point objective (RPO) peer snapshot of the primary cluster as a "failover" snapshot to update data in the second storage location. From sub-operation 554, the flowchart proceeds to operation 506 of FIG. 5A, eventually performing a failover of any desired applications to the recovery cluster, e.g., as will be described in further detail below.

Returning now to decision 552, by proceeding to sub-operation 556 in response to determining that the primary cluster went offline (or is scheduled to go offline shortly) intentionally, the flowchart begins assisting in a failover of applications previously running on the primary cluster to the acting primary cluster. For instance, sub-operation 556 includes sending one or more instructions to stop (e.g., pause) any applications running on the primary cluster. Moreover, sub-operation 558 includes receiving any pending application data flushed from the primary cluster, while sub-operation 560 includes sending one or more instructions to the first storage location to capture a peer snapshot (e.g., failover snapshot) of the primary cluster. In some approaches a peer snapshot may also be taken of the recovery cluster, e.g., to determine whether any discrepancies exist between the data stored at each cluster. Furthermore, the applications are re-started on the acting primary cluster. See sub-operation 562.

Returning now to FIG. 5A, operation 506 includes using the acting primary cluster to run applications and satisfy data operations which are received. Now that the acting primary cluster (previously acting as the recovery cluster) is able to maintain operation of the overall system, repair may be performed on the offline primary cluster without introducing any performance delays. Accordingly, the acting primary cluster at the second storage location may be used to run applications and satisfy data operations as long as the offline primary cluster remains as such.

However, upon determining that the primary cluster at the first storage location is back online, the acting primary cluster is synched with the primary cluster at the first storage location. See operation 508. In other words, in response to determining that the primary cluster at the first storage location is back online, any amendments made to the data in the second storage location while the primary cluster at the first storage location was offline are preferably transitioned to the primary cluster at the first storage location now that it is back online. Moreover, it should be noted that the primary cluster at the first storage location is referred to herein as the "online primary cluster" upon coming back online.

Figure 5C:
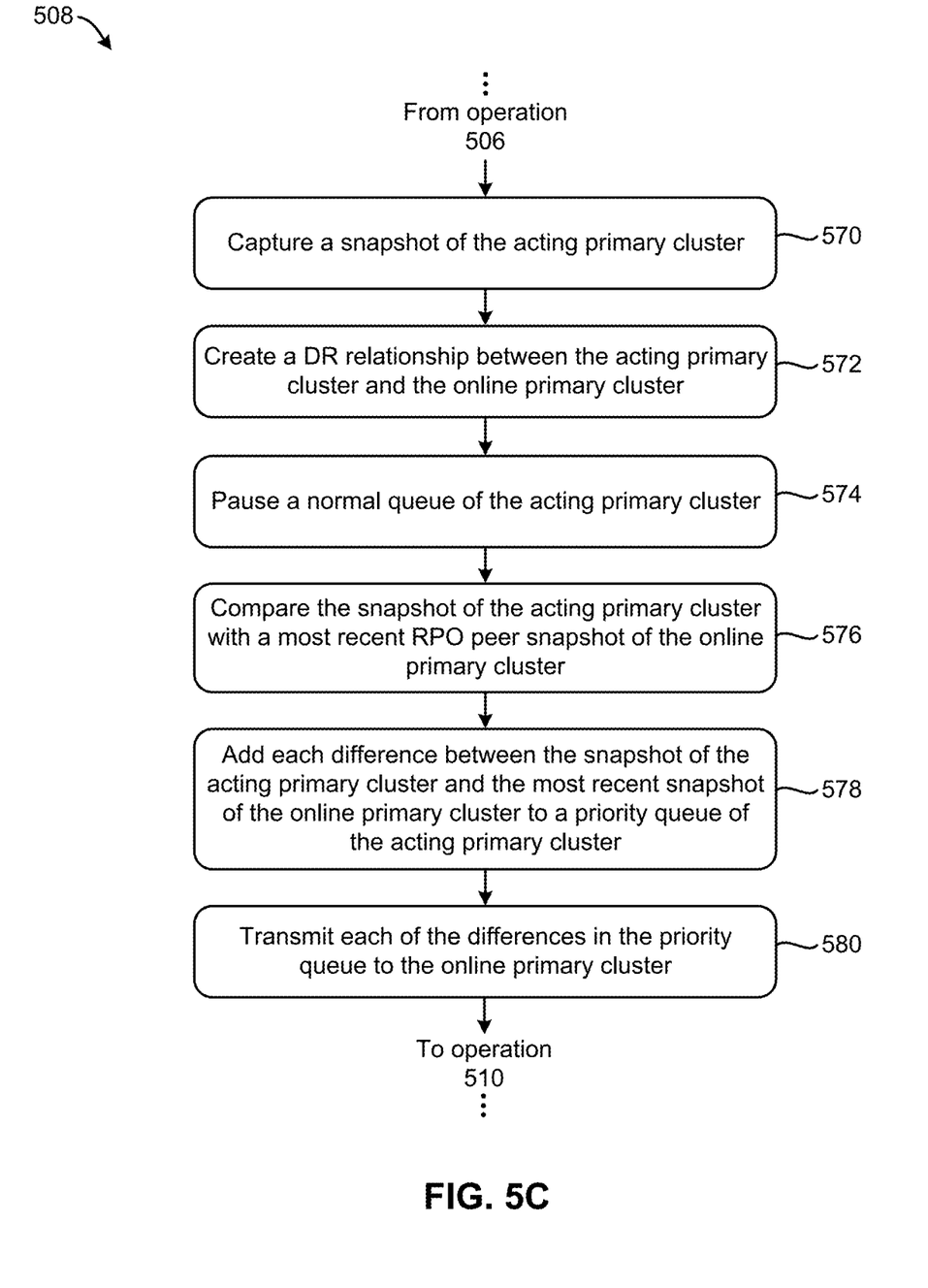
FIG. 5C is a flowchart of sub-processes for one of the operations in the method of FIG. 5A, in accordance with one embodiment.

Referring momentarily now to FIG. 5C, sub-processes for synching the acting primary cluster with the primary cluster at the first storage location which is back online are illustrated at a high level in accordance with one embodiment. Accordingly, one or more of the sub-processes included in FIG. 5C may be used to perform operation 508 of FIG. 5A. However, it should be noted that the sub-processes of FIG. 5C are illustrated in accordance with one embodiment which is in no way intended to limit the invention.

As shown, sub-operation 570 includes capturing a snapshot of the acting primary cluster. Moreover, sub-operation 572 includes creating a DR relationship between the acting primary cluster and the online primary cluster. According to some approaches, creating the DR relationship is achieved by adding support for synchronized peer snapshots to continually create periodic peer snapshots of the acting primary cluster and/or the online primary cluster. The DR relationship preferably specifies that the online primary cluster is temporarily acting as a recovery cluster to the acting primary cluster. In other words, the cluster at the first storage location and the cluster at the second storage location at least temporarily switch roles for the DR relationship created in sub-operation 572. Doing so allows for any changes that have been made to the data at the second storage location to be transmitted to the first storage location, e.g., as would be appreciated by one skilled in the art after reading the present description.

Referring still to FIG. 5C, sub-operation 574 includes pausing a normal queue of the acting primary cluster such that no data is sent to the online primary cluster from the normal queue during the process of synching the acting primary cluster with the online primary cluster. As this process of synching the acting primary cluster with the online primary cluster pursues, data operations may continue to be received and satisfied by the acting primary cluster in order to avoid system-wide downtime. As these data operations are satisfied, they are added to the normal queue to be transmitted to the online primary queue. Accordingly, the changes made to the data at the second storage location during the synching process may be replicated to the online primary queue, e.g., as will soon become apparent. However, some of these data operations may correspond to data which has been updated while the primary cluster at the first storage location was offline. Thus, it is preferred that the synching process is completed before additional data operations are implemented at the first storage location.

Sub-operation 576 further includes comparing the snapshot of the acting primary cluster with a most recent RPO peer snapshot of the online primary cluster. According to some approaches, this snapshot comparison is performed by determining the "snapdiff" therebetween, e.g., using any processes which would be apparent to one skilled in the art after reading the present description. Moreover, each difference identified between the snapshot of the acting primary cluster and the most recent RPO peer snapshot of the online primary cluster is added to a priority queue of the acting primary cluster. See sub-operation 578. Although the normal queue has been paused a priority queue is also included at the second storage location in preferred approaches. As mentioned above, each of the entries in a priority queue are processed prior to any of the entries in a normal queue. The priority queue may therefore be used in conjunction with the normal queue to selectively control the order which various data operations are performed at (e.g., transmitted to) the online primary cluster at the first storage location.

Accordingly, sub-operation 580 further includes transmitting (e.g., replicating) each of the differences in the priority queue to the online primary cluster. While transmitting the entries in the priority queue to the online primary cluster may be performed differently depending on the desired approach, in some approaches the transmitting is performed in the background and asynchronously, as to not disrupt continued operation of the system.

Returning now to FIG. 5A, method 500 proceeds to operation 510 in response to determining that each of the differences in the priority queue have been transmitted to the online primary cluster. There, operation 510 includes transmitting entries in the normal queue to the online primary cluster. In approaches where the normal queue was actually paused, operation 510 may also include unpausing the normal queue such that entries stored therein may be transmitted to the online primary cluster. Moreover, although the entries may be transmitted differently depending on the desired approach, in some approaches the entries are transmitted asynchronously and continuously.

Proceeding to operation 512, method 500 includes performing a failback of the applications running on the acting primary cluster to the online primary cluster. In some approaches, performing the failback of the applications includes actually stopping the applications running on the acting primary cluster for a relatively short amount of time (e.g., one or more predetermined clock cycles). Moreover, a snapshot of the acting primary cluster is captured before flushing any pending data to the online primary cluster, including the snapshot. In response to determining the flush has completed, one or more instructions are sent for the applications to re-target the online primary cluster. It should be noted that the failback of operation 512 may be selectively performed. For instance, in some approaches operation 512 is actually performed in response to identifying that the system has a low current workload. Further still, any one or more of the approaches described above with respect to sub-operations 556, 558, and/or 560 may be used, at least in part, to perform operation 512.

Further still, operation 514 includes sending one or more instructions to reestablish a DR relationship between the first and second storage locations. According to some approaches, the DR relationship reidentifies the acting primary cluster at the second storage location as a recovery (or "secondary") cluster and reidentifies the online primary cluster at the first storage location as the primary cluster. This allows the storage locations to regain the operational responsibilities they had prior to the primary cluster going offline. This may be desirable for systems in which the first storage location has a higher level of performance relative to a level of performance of the second storage location.

Although some approaches return operational control to the online primary cluster of the first storage location following the aforementioned synching process with the acting primary cluster, this may not be performed in other approaches. For example, the acting primary cluster at the second storage location may operate at a substantially similar level of performance as the primary cluster at the first storage location. It follows that in some approaches, rather than perform operations 512 and 514, method 500 may include sending one or more instructions to establish a DR relationship between the first and second storage locations which reidentifies the acting primary cluster at the second storage location as the new primary cluster and reidentifies the online primary cluster at the first storage location as a new recovery cluster. In other words, the second storage location effectively becomes the primary storage location and the first storage location is reassigned as being the recovery storage location moving forward.

This reverse DR relationship can be established efficiently by only replicating those data blocks which were modified by applications during the time that the primary cluster was offline. Moreover, this replication is preferably performed in the background and asynchronously. This reverse DR relationship may even be maintained in some approaches until system throughput decreases to the point that the DR relationship between the two clusters may be returned to an original configuration, thereby even further reducing system delays and increasing efficiency.

It follows that various ones of the approaches included herein are able to efficiently recover from intentional and unintentional failure events experienced at a storage location in a distributed data replication system. For instance, application downtime and/or outage is significantly reduced during the failback of applications to a primary cluster after being brought back online. In some approaches the failback between clusters can be performed as quickly as re-targeting applications as data changes are performed at one of the clusters is replicated to the other asynchronously yet also continuously.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
in response to determining that a primary cluster at a first storage location has gone offline, establishing a recovery cluster at a second storage location as an acting primary cluster;
in response to determining that the primary cluster at the first storage location is back online, synching the acting primary cluster with the online primary cluster by:
capturing a snapshot of the acting primary cluster,
pausing a normal queue of the acting primary cluster,
comparing the snapshot of the acting primary cluster with a most recent snapshot of the online primary cluster,
adding each difference between the snapshot of the acting primary cluster and the most recent snapshot of the online primary cluster to a priority queue of the acting primary cluster, and
transmitting each of the differences in the priority queue to the online primary cluster; and in response to determining that each of the differences in the priority queue have been transmitted to the online primary cluster, transmitting entries in the normal queue to the online primary cluster.

2. The computer-implemented method of claim 1, wherein establishing the second storage location as the acting primary cluster includes:
using the most recent snapshot of the primary cluster to update data in the second storage location.

3. The computer-implemented method of claim 1, wherein establishing the second storage location as the acting primary cluster includes:
assisting in a failover of applications previously running on the primary cluster to the acting primary cluster by:
receiving any pending application data flushed from the primary cluster, and
re-starting the applications on the acting primary cluster.

4. The computer-implemented method of claim 1, comprising:
performing a failback of applications running on the acting primary cluster to the online primary cluster; and
sending one or more instructions to reestablish a disaster recovery relationship between the first and second storage locations, wherein the disaster recovery relationship reidentifies the acting primary cluster at the second storage location as a recovery cluster and reidentifies the online primary cluster at the first storage location as the primary cluster.

5. The computer-implemented method of claim 4, wherein performing a failback of applications running on the acting primary cluster to the online primary cluster includes:
stopping the applications running on the acting primary cluster;
flushing any pending replication data to the online primary cluster; and
sending one or more instructions for the applications to re-target the online primary cluster.

6. The computer-implemented method of claim 1, wherein synching the acting primary cluster with the online primary cluster includes:
continuing to add changes made at the acting primary cluster to the paused normal queue.

7. The computer-implemented method of claim 1, comprising:
sending one or more instructions to establish a disaster recovery relationship between the first and second storage locations, wherein the disaster recovery relationship reidentifies the acting primary cluster at the second storage location as the primary cluster and reidentifies the online primary cluster at the first storage location as a recovery cluster.

8. A computer program product comprising a computer readable storage medium having program instructions embodied therewith, the program instructions readable and/or executable by a processor to cause the processor to:
in response to determining that a primary cluster at a first storage location has gone offline, establish, by the processor, a recovery cluster at a second storage location as an acting primary cluster;
in response to determining that the primary cluster at the first storage location is back online, synch, by the processor, the acting primary cluster with the online primary cluster by:
capturing a snapshot of the acting primary cluster,
pausing a normal queue of the acting primary cluster,
comparing the snapshot of the acting primary cluster with a most recent snapshot of the online primary cluster,
adding each difference between the snapshot of the acting primary cluster and the most recent snapshot of the online primary cluster to a priority queue of the acting primary cluster, and
transmitting each of the differences in the priority queue to the online primary cluster; and
in response to determining that each of the differences in the priority queue have been transmitted to the online primary cluster, transmit, by the processor, entries in the normal queue to the online primary cluster.

9. The computer program product of claim 8, wherein establishing the second storage location as the acting primary cluster includes:
using the most recent snapshot of the primary cluster to update data in the second storage location.

10. The computer program product of claim 8, wherein establishing the second storage location as the acting primary cluster includes:
assisting in a failover of applications previously running on the primary cluster to the acting primary cluster by:
receiving any pending application data flushed from the primary cluster, and
re-starting the applications on the acting primary cluster.

11. The computer program product of claim 8, the program instructions readable and/or executable by the processor to cause the processor to:
perform, by the processor, a failback of applications running on the acting primary cluster to the online primary cluster; and
send, by the processor, one or more instructions to reestablish a disaster recovery relationship between the first and second storage locations, wherein the disaster recovery relationship reidentifies the acting primary cluster at the second storage location as a recovery cluster and reidentifies the online primary cluster at the first storage location as the primary cluster.

12. The computer program product of claim 11, wherein performing a failback of applications running on the acting primary cluster to the online primary cluster includes:
stopping the applications running on the acting primary cluster;
flushing any pending replication data to the online primary cluster; and
sending one or more instructions for the applications to re-target the online primary cluster.

13. The computer program product of claim 8, wherein synching the acting primary cluster with the online primary cluster includes:
continuing to add changes made at the acting primary cluster to the paused normal queue.

14. The computer program product of claim 8, the program instructions readable and/or executable by the processor to cause the processor to:
send, by the processor, one or more instructions to establish a disaster recovery relationship between the first and second storage locations, wherein the disaster recovery relationship reidentifies the acting primary cluster at the second storage location as the primary cluster and reidentifies the online primary cluster at the first storage location as a recovery cluster.

15. A system, comprising:
a processor; and logic executable by the processor, the logic being configured to:
in response to determining that a primary cluster at a first storage location has gone offline, establish, by the processor, a recovery cluster at a second storage location as an acting primary cluster;
in response to determining that the primary cluster at the first storage location is back online, synch, by the processor, the acting primary cluster with the online primary cluster by:
capturing a snapshot of the acting primary cluster,
pausing a normal queue of the acting primary cluster,
comparing the snapshot of the acting primary cluster with a most recent snapshot of the online primary cluster,
adding each difference between the snapshot of the acting primary cluster and the most recent snapshot of the online primary cluster to a priority queue of the acting primary cluster, and
transmitting each of the differences in the priority queue to the online primary cluster; and
in response to determining that each of the differences in the priority queue have been transmitted to the online primary cluster, transmit, by the processor, entries in the normal queue to the online primary cluster.

16. The system of claim 15, wherein establishing the second storage location as the acting primary cluster includes:
using the most recent snapshot of the primary cluster to update data in the second storage location.

17. The system of claim 15, wherein establishing the second storage location as the acting primary cluster includes:
assisting in a failover of applications previously running on the primary cluster to the acting primary cluster by:
receiving any pending application data flushed from the primary cluster, and
re-starting the applications on the acting primary cluster.

18. The system of claim 15, the logic being configured to:
perform, by the processor, a failback of applications running on the acting primary cluster to the online primary cluster by:
stopping the applications running on the acting primary cluster,
flushing any pending replication data to the online primary cluster, and
sending one or more instructions for the applications to re-target the online primary cluster; and
send, by the processor, one or more instructions to reestablish a disaster recovery relationship between the first and second storage locations, wherein the disaster recovery relationship reidentifies the acting primary cluster at the second storage location as a recovery cluster and reidentifies the online primary cluster at the first storage location as the primary cluster.

19. The system of claim 15, wherein synching the acting primary cluster with the online primary cluster includes:
continuing to add changes made at the acting primary cluster to the paused normal queue.

20. The system of claim 15, the logic being configured to:
send, by the processor, one or more instructions to establish a disaster recovery relationship between the first and second storage locations, wherein the disaster recovery relationship reidentifies the acting primary cluster at the second storage location as the primary cluster and reidentifies the online primary cluster at the first storage location as a recovery cluster.

* * * * *

UNITED STATES PATENT AND TRADEMARK OFFICE
CERTIFICATE OF CORRECTION

PATENT NO. : 10,649,862 B1  
APPLICATION NO. : 16/224655  
DATED : May 12, 2020  
INVENTOR(S) : Ravindra Sure et al.

Page 1 of 1

It is certified that error appears in the above-identified patent and that said Letters Patent is hereby corrected as shown below:

On the Title Page

Item (72) Inventors, please replace "Karrthik K. G." with --Karrthik Kalaga Gopalakrishnan--.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*